United States Patent [19]
Courtney et al.

[11] Patent Number: 6,049,363
[45] Date of Patent: Apr. 11, 2000

[54] OBJECT DETECTION METHOD AND SYSTEM FOR SCENE CHANGE ANALYSIS IN TV AND IR DATA

[75] Inventors: Jonathan D. Courtney, Dallas; Dinesh R. Nair, Austin, both of Tex.

[73] Assignee: Texas Instruments Incorporated, Dallas, Tex.

[21] Appl. No.: 08/795,434

[22] Filed: Feb. 5, 1997

Related U.S. Application Data

[60] Provisional application No. 60/011,189, Feb. 5, 1996.

[51] Int. Cl.[7] .................................................. H04N 5/14
[52] U.S. Cl. ......................................... 348/700; 382/107
[58] Field of Search .................................. 348/135, 148, 348/42, 700, 699, 385, 118, 576–579, 162–172, 25; 340/435, 937, 152, 155; 358/22; 382/107; H04N 5/14

[56] References Cited

U.S. PATENT DOCUMENTS

| | | | |
|---|---|---|---|
| 3,947,833 | 3/1976 | Eckstein | 348/135 |
| 4,047,205 | 9/1977 | Grosskopf | 348/135 |
| 4,393,394 | 7/1983 | Mccoy | 358/22 |
| 4,989,164 | 1/1991 | Desruosseaux | 348/135 |
| 5,034,811 | 7/1991 | Palm | 358/105 |
| 5,065,251 | 11/1991 | Shuhart, Jr. et al. | 358/335 |
| 5,563,652 | 10/1996 | Toba | 348/155 |
| 5,613,032 | 3/1997 | Cruz et al. | 386/69 |
| 5,638,116 | 6/1997 | Shimoura et al. | 348/118 |
| 5,732,146 | 3/1998 | Yamada et al. | 382/107 |
| 5,808,664 | 9/1998 | Yamashita et al. | 348/42 |

OTHER PUBLICATIONS

Suh–Yin Lee and Huan–Ming Kao, Video Indexing–An Approach based on Moving Object and Track, SPIE vol. 1908, pp. 25–36, Feb. 1993.

Shinji Abe and Yohinobu Tomura, Scene Retrieval Method Using Temporal Condition Changes, 1993 Sripta Technica Inc., pp. 92–101, Jul. 1992.

Young Reancis Day, Object–Oreinted Conceptual Modeling of Video Data, 1995 IEEE, pp. 401–408, Jun. 1995.

Jain, R., et al., "Segmentation through the Detection of Changes Due to Motion," *Computer Graphics and Image Processing*, 11, 13–34 (1979).

*Primary Examiner*—Howard Britton
*Assistant Examiner*—Tung Vo
*Attorney, Agent, or Firm*—Robert L. Troike; Wade James Brady, III; Richard L. Donaldson

[57] ABSTRACT

Object detection for scene change analysis is performed by a statistical test applied to data extracted from two images taken from the same scene from identical viewpoints. It is assumed that a single change region corresponding to an object that is present in one image but absence in the other is given. In the case of TV data, the test consists of measuring the coincidence of edge pixels in each image with the boundary of the change region. In the case of IR data, the tests consist of measuring the pixel intensity variance within the change region in each image.

21 Claims, 3 Drawing Sheets

OBJECT DETECTION METHOD AND SYSTEM FOR SCENE CHANGE ANALYSIS IN TV AND IR DATA

This application claims priority of provisional application Number 60/011,189, filed Feb. 2, 1996.

The present application is related to co-pending application Ser. No. 08/795,432 (TI-21411), entitled "Motion Based Event Detection System and Method", by Jonathan D. Courtney, filed concurrently herewith. This application is incorporated herein by reference.

TECHNICAL FIELD OF THE INVENTION

This invention relates to scene change analysis as used, for example, in video surveillance as discussed in related application cited above.

BACKGROUND OF THE INVENTION

In order to facilitate automated video surveillance systems, it is advantageous to have the capability of performing scene change analysis, that is, analysis of the changes in a visible scene from one point in time to another. In particular, it is useful to be able to detect a change in the objects present in a given scene. For example, in comparing two images taken of the same scene at different times, the goal is to detect if an object has been added or removed from the scene. If the two images are obtained from the same viewpoint, detecting the presence of a change itself is often straightforward: when overall viewing conditions are constant, image differencing and thresholding will reveal regions in the scene that have undergone visible change in the two images. FIG. 1 is a diagram of a system which implements this technique. Images 1 and 2 are subtracted and thresholded at some threshold h, resulting in R, an image of the "change regions". Optional low-pass filtering and morphology may also be used to smooth the resulting image. For low-pass filtering, see Dana H. Ballard and Christopher M. Brown, *Computer Vision.* Prentice-Hall, Inc. Englewood Cliffs, N.J., 1982. For morphology see, Robert M. Haralick and Linda G. Shapiro. *Computer and Robot Vision,* volume 2. Addison-Wesley, Reading, Mass., 1993.

However, such a technique only determines the occurrence, location, and shape of change regions; it cannot, in itself, determine whether a detected change is due to an object that is present in the first image but absent in the second or vice-versa. It is an object of this invention to make such a determination in order to aid scene change analysis.

SUMMARY OF THE INVENTION

To perform object detection for scene change analysis, a statistical test is applied to data extracted from two images taken of the same scene from identical viewpoints. It is assumed that a single change region corresponding to an object that is present in one image but absent in the other is also given. The test indicates in which change region of the two images the object is present.

These and other features of the invention that will be apparent to those skilled in the art from the following detailed description of the invention, taken together with the accompanying drawings.

DESCRIPTION OF THE PREFERRED EMBODIMENTS OF THE PRESENT INVENTION

Figure 1:
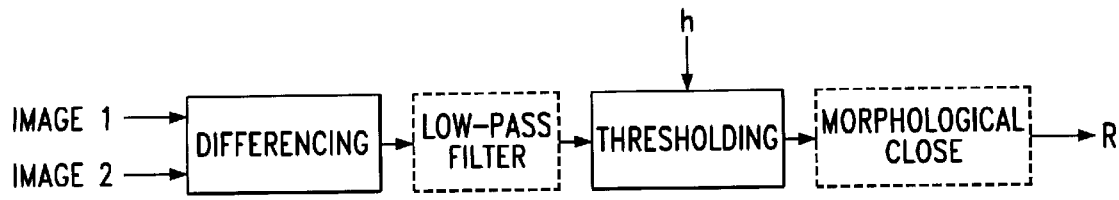
FIG. 1 illustrates a system implementation of prior art change detection technique.

The object detection method described here takes as input two images of a scene obtained from the same viewpoint and a specified change region in the scene. It is assumed that a change region image is generated by an image differencing and thresholding method as described above in connection with FIG. 1, and is due to a single object that is present in the change region of one image but not the change region of the other. The object detection method in accordance with the present invention applies a statistical test to determine in which change region of the two images the object is present. The test is different in the case of images obtained from a TV or infrared (IR) camera.

Figure 2:
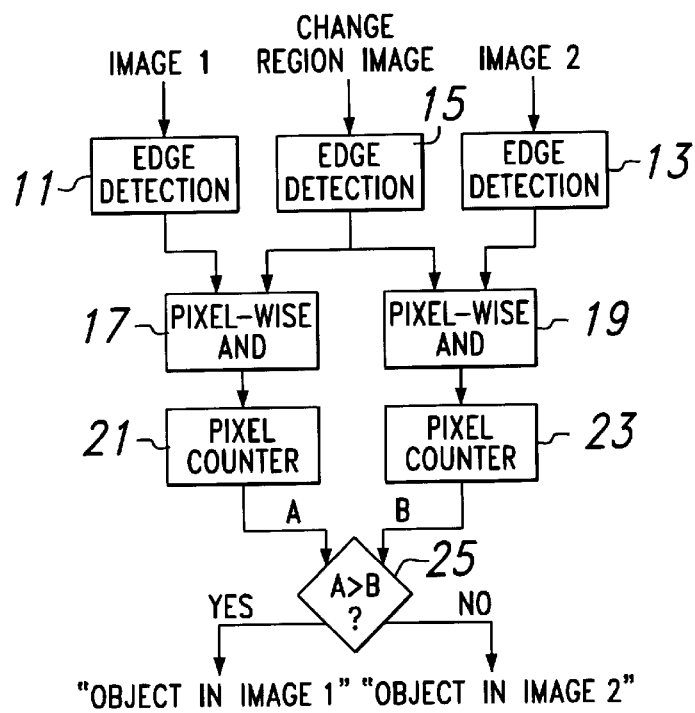
FIG. 2 illustrates the system implementation of the object detection technique for TV data in accordance with one embodiment of the present invention.
Figure 3:
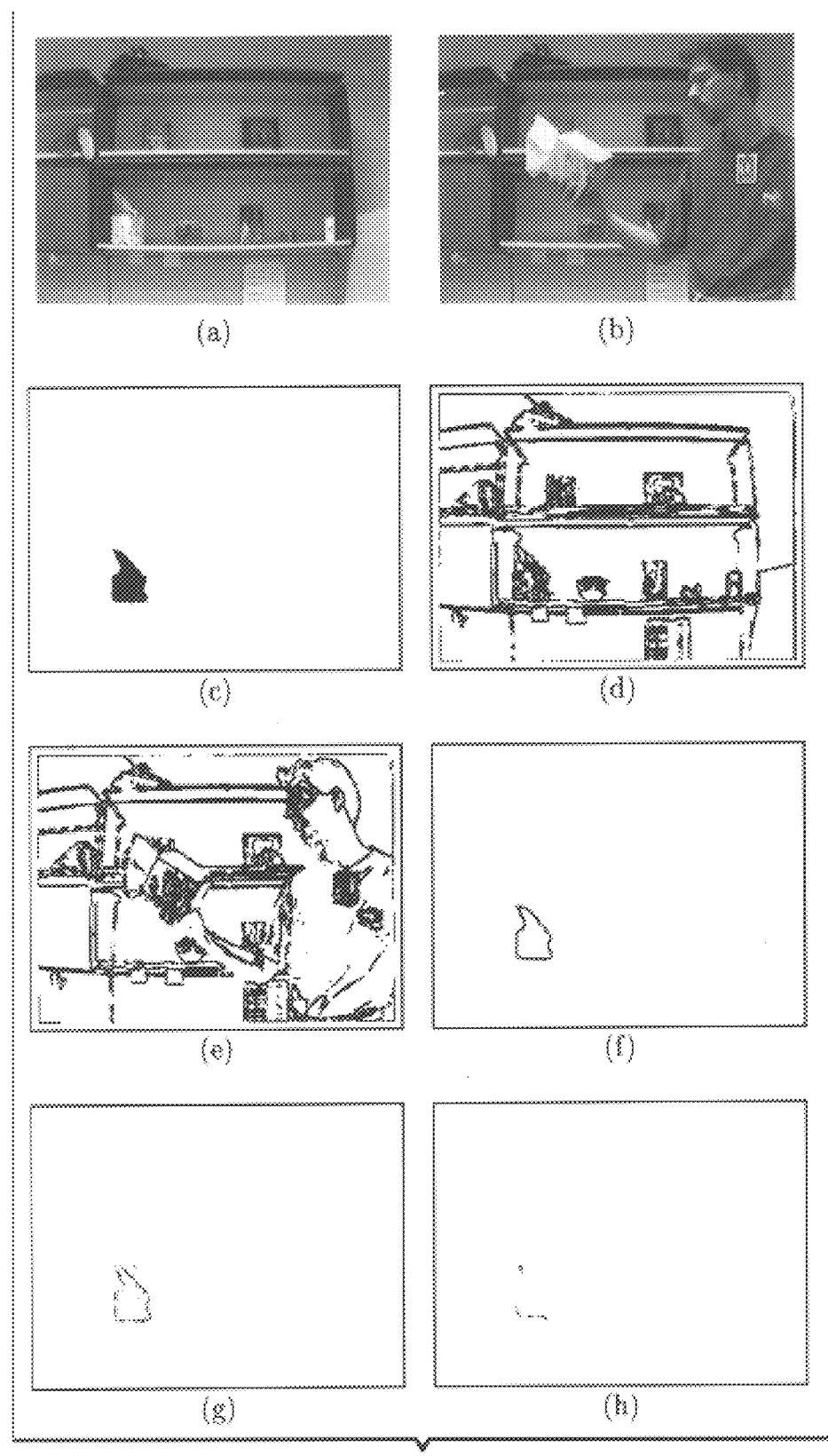
FIG. 3 illustrates an example of object detection in TV data, where 3(*a*) is image 1; 3(*b*) image 2; 3(*c*) a change region; 3(*d*) edge image of 3(*a*), found using Sobel operator; 3(*e*) edge image of 3(*b*); 3(*f*) edge image of 3(*c*), showing boundary pixels; 3(*g*) pixels coincident in (3)*d* and (3)*f*; 3(*h*) pixels coincident in 3(*e*) and 3(*f*)

In the case of images obtained from a TV camera, the test is based on the following observation: a higher probability exists that the boundary of the change region will match intensity edges detected in the image for which the object is present in the change region than the image for which the object is absent from the change region. The test is implemented by applying an edge detection operator (See Ballard, et al. cited above.) to the two images and checking for coincident boundary pixels in the change region. FIG. 2 is a diagram of a system which implements this process. First, the two images, Image 1 and Image 2, undergo edge detection at 11 and 13, and the image of a single change region of interest (taken from R of FIG. 1) undergoes edge detection at detector 15, such as with the Sobel operator (See Ballard, et al. cited above.). Next, the edge image of the change region is ANDed separately with the edge images of images 1 and 2 at pixel-wise AND gates 17 and 19. A pixel counter 21 then counts the number of pixels that are "on" (enabled) out of AND gate 17 to give count value A. A pixel counter 23 counts the pixels "on" (enabled) out of AND gate 19 to give a count value B. If the count value "A" is greater than the count value "B", the system comparator 25 determines that the object is present in the change region of image 1. Otherwise, it determines that the object is present in the change region of image 2. FIG. 3 shows this process applied to example data.

In FIG. 3(*a*) the image 1 is shown. FIG. 3(*b*) shows image 2. FIG. 3(*c*) shows the change region of interest. The edge image of 3(*a*) (image 1, from Edge Detector 11) is shown in FIG. 3(*d*). This was found using the Sobel operator as discussed in Ballard, et al. cited above and incorporated herein by reference. The edge image of 3(*b*) is shown in FIG. 3(*e*). FIG. 3(*f*) shows the edge image of 3(*c*) (the change region). FIG. 3(*g*) illustrates the pixels coincident in FIGS.

3(d) and 3(f) and FIG. 3(h) illustrates the pixels coincident in 3(e) and 3(f). The greater number of coincident pixels shown in FIG. 3(g) than in 3(h) support the hypothesis that the object is present in the change region of image 1.

Figure 4:
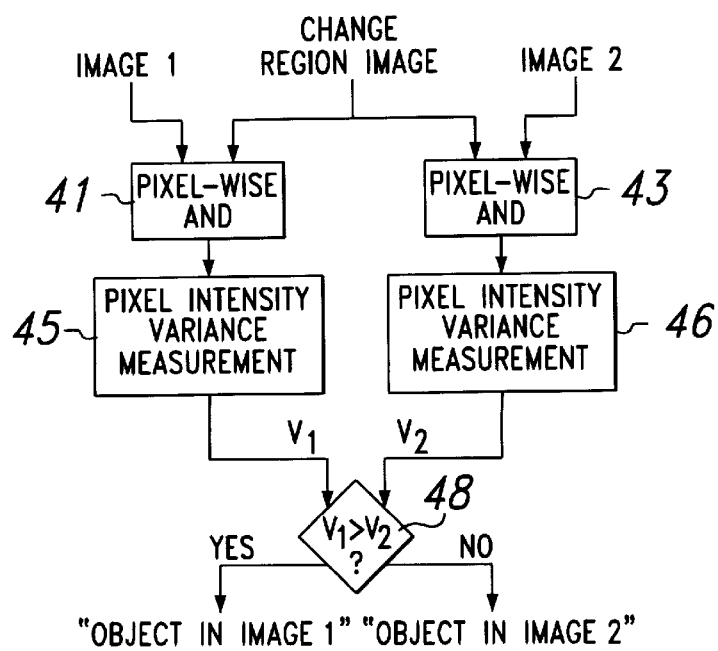
FIG. 4 illustrates the system implementation of the object detection technique for IR data in accordance with another embodiment of the present invention.
Figure 5:
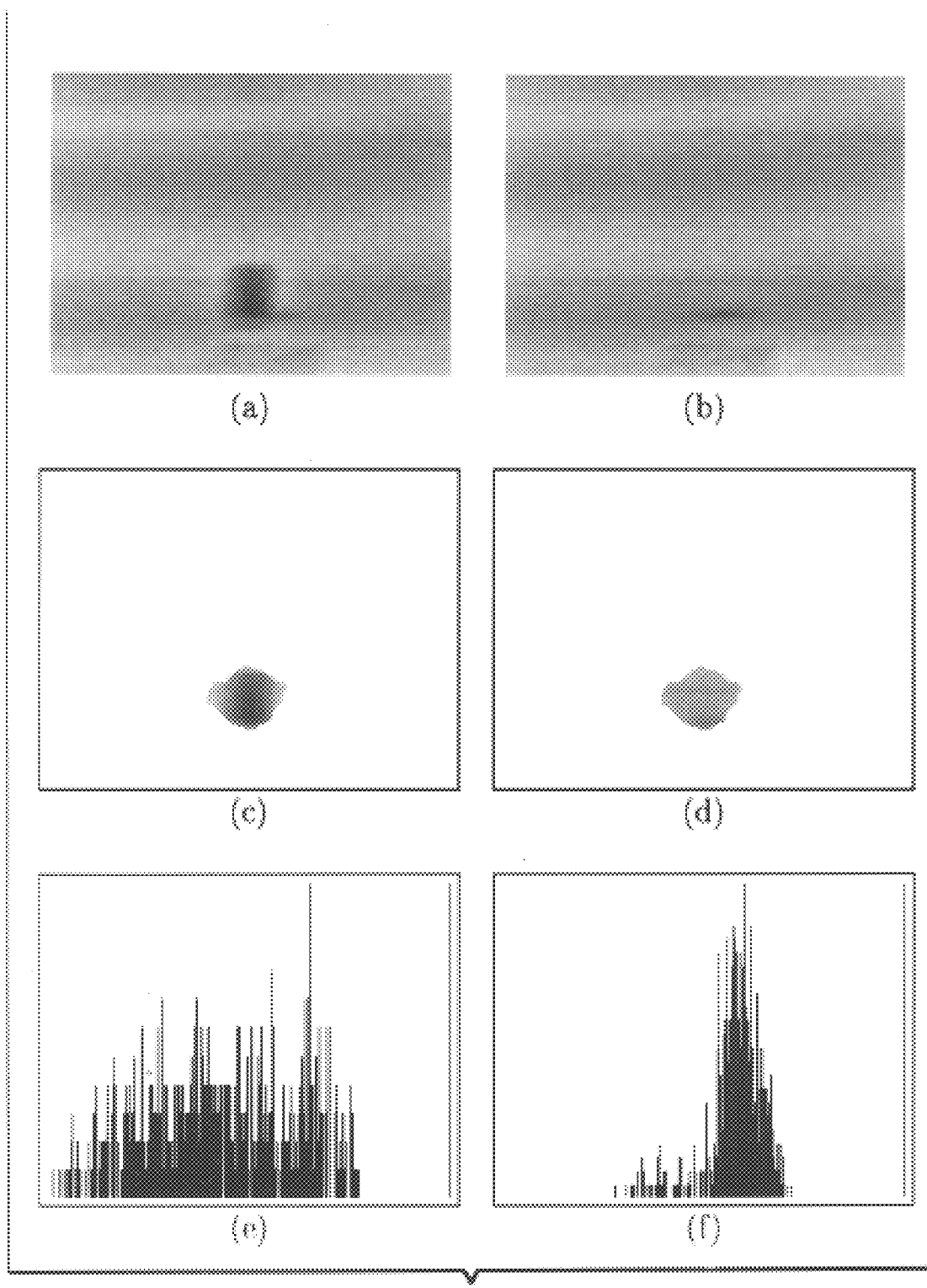
FIG. 5 illustrates an example of object detection in IR data, where 5(*a*) is image 1; 5(*b*) image 2; 5(*c*) the change region in image 1; 5(*d*) the change region in image 2; 5(*e*) histogram of 5(*c*) (scaled); 5(*f*) histogram of 5(*d*) (scaled).

In the case of images obtained from an IR camera, the object may not have easily detectable edges due to heat diffusion and image blurring. In some IR cameras, however, objects exhibit a contrasting halo due to opto-mechanical image sharpening. For image sharpening, see Azriel Rosenfeld and Avinash Kak. *Digital Picture Processing*, volume 1. Academic Press, New York, N.Y., second edition, 1982. Thus, the test may be implemented by comparing the variance of pixel intensities within the change region in the two images. The variance V is computed as $$V = \frac{1}{n}\sum_{i=1}^{n} I_i^2 - \left(\frac{1}{n}\sum_{i=1}^{n} I_i\right)^2,$$

where $I_i$ is the intensity of the i-th pixel within the change region of the image. Since background regions tend to exhibit more constant pixel intensities, the variance will be highest for the image where the haloed object is present. FIG. 4 is a diagram of a system which implements this process. First, the two images 1 and 2 are ANDed at 41 and 43 with the image of a single change region from R of FIG. 1, resulting in an image of only the data present within the change region in each image. Next, the variance of the pixel intensities within the change region of each image is measured separately at 45 and 46 to get signals representing measurements $V_1$ and $V_2$. If the value of measurement signal $V_1$ is greater than the value of measurement signal $V_2$, comparator 48 determines that the object is present in the change region of image 1. Otherwise, it determines that the object is present in the change region of image 2. FIG. 5 shows this process applied to example data.

FIG. 5(a) illustrates image 1 and FIG. 5(b) illustrates image 2. The change region in image 1 is shown in FIG. 5(c). The change region in image 2 is shown in FIG. 5(d). FIG. 5(e) shows a scaled histogram of FIG. 5(c), and FIG. 5(f) shows a scaled histogram of FIG. 5(d). The greater pixel intensity variance exhibited in FIG. 5(c) when compared to 5(d) supports the hypothesis that the object is present in the change region of image 1.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of performing object detection for scene change analysis in Infrared camera data comprising the steps of:
   a) acquiring two Infrared camera images of a scene from identical view points at different times;
   b) determining a change region corresponding to an object that is present in one image but absent in the other image;
   c) applying a statistical test to the two images within the change region to detect objects;
   d) analyzing motion of said objects;
   e) generating a symbolic motion description of object motion; and
   f) placing index marks in said symbolic motion description to identify occurrence of events in the video.

2. The method of claim 1 wherein the statistical test comprises measuring the pixel intensity variance within the change region in each image.

3. The method of claim 2 wherein said analyzing step includes tracking said detected objects using linear prediction of object position.

4. The method of claim 2 wherein said analyzing step includes associating objects in successive frames of said video using a mutual-nearest-neighbor criterion.

5. The method of claim 2 wherein said analyzing step includes determining paths of said objects and intersection with paths of other objects.

6. The method of claim 2 wherein said generating step includes generating a directed graph reflective of the paths and path intersections of said objects.

7. The method of claim 2 wherein said generating step includes generating primary and secondary graph links reflective of the likelihood of accurate motion analysis.

8. The method of claim 2 wherein said generating step includes generating a record of image statistics for objects in every video frame.

9. The method of claim 8 wherein said generating a record of image statistics step includes generating size, shape, position, and time-stamp of objects in every video frame.

10. The method of claim 2 wherein said generating step includes generating hierarchical graph node groupings reflective of paths and intersections of said objects.

11. The method of claim 10 wherein said hierarchical graph node groupings reflect the likelihood of accurate motion analysis.

12. The method of claim 2 wherein said placing index marks step includes placement of index marks corresponding to motion events in accordance with said hierarchical graph node groupings.

13. The method of claim 12 wherein said placing index marks step includes use of a rule-based classifier.

14. The method of claim 12 wherein said placing index marks step corresponding to motion events includes placement of one or more marks corresponding to appearance, disappearance, deposit, removal, entrance, exit, motion, or rest of objects.

15. A method of performing object detection for scene change in video IR data comprising the steps of:
   a) acquiring two IR images of a scene from identical view points at different items;
   b) determining a change region corresponding to an object that is present in one image but absent in the other image;
   c) applying a statistical test to the two images within the change region to detect objects;
   d) analyzing motion of said objects:
   e) generating a symbolic motion description of object motion;
   f) placing index marks in said symbolic motion description to identify occurrence of events in video;
   g) receiving content-base queries;
   h) matching queries with symbolic video information and said index marks; and
   i) providing video sequences corresponding to the query.

16. The method of claim 15 wherein the statistical test comprises measuring the pixel intensity variance within the change region in each image.

17. The method of claim 15 wherein said step of receiving content-base queries includes receiving queries with constraints involving one or more of a video clip, time interval, object, spatial region, or motion event.

18. The method of claim 17 wherein constraints for said queries can be specified by manipulation of video clips.

19. The method of claim 15 wherein said step of matching queries with symbolic video information includes filtering symbolic information to meet the query constraints of one or more video clip, time interval, object, spatial region, or motion event.

20. The method of claim 15 wherein said step of providing video sequences includes a system clipboard with sets of video clips for progressive refinement of content based queries and query results.

21. A system for providing video indexing of IR images comprising:

a) means for acquiring two IR images of a scene from identical view points at different times;

b) means for determining a change region corresponding to an object that is present in one image but absent in the other image;

c) means for determining pixel intensity variance within the change region to detect objects;

d) means for analyzing motion of said objects;

e) means for generating a symbolic motion description of object motion; and f) means for placing index marks in said symbolic motion description to identify occurrence of events in the video.

* * * * *